United States Patent
Kim

(10) Patent No.: US 11,353,842 B2
(45) Date of Patent: Jun. 7, 2022

(54) APPARATUS AND METHOD FOR AUTOMATICALLY CONVERTING THERMAL DISPLACEMENT COMPENSATION PARAMETERS OF MACHINE TOOL

(71) Applicant: DOOSAN MACHINE TOOLS CO., LTD., Changwon-si (KR)

(72) Inventor: Ki Hong Kim, Gimhae-si (KR)

(73) Assignee: DOOSAN MACHINE TOOLS CO., LTD., Changwon-si (KR)

(*) Notice: Subject to any disclaimer, the term of this patent is extended or adjusted under 35 U.S.C. 154(b) by 729 days.

(21) Appl. No.: 16/089,026

(22) PCT Filed: Mar. 28, 2017

(86) PCT No.: PCT/KR2017/003319
§ 371 (c)(1),
(2) Date: Sep. 27, 2018

(87) PCT Pub. No.: WO2017/171352
PCT Pub. Date: Oct. 5, 2017

(65) Prior Publication Data
US 2020/0301391 A1    Sep. 24, 2020

(30) Foreign Application Priority Data
Mar. 28, 2016  (KR) .................. 10-2016-0037091

(51) Int. Cl.
*G05B 19/404* (2006.01)
*G06F 17/16* (2006.01)
*B23Q 23/00* (2006.01)

(52) U.S. Cl.
CPC .......... *G05B 19/404* (2013.01); *B23Q 23/00* (2013.01); *G06F 17/16* (2013.01); *G05B 2219/49219* (2013.01)

(58) Field of Classification Search
CPC ........ G05B 19/404; G05B 2219/49219; G05B 2219/49206; G05B 2219/49207;
(Continued)

(56) References Cited

U.S. PATENT DOCUMENTS

| | | | |
|---|---|---|---|
| 6,456,896 B1* | 9/2002 | Ito ..................... | G05B 19/404 700/174 |
| 7,517,480 B2* | 4/2009 | Sabin .................. | B29C 45/766 264/40.1 |

(Continued)

FOREIGN PATENT DOCUMENTS

| | | |
|---|---|---|
| JP | 2007-7822 A | 1/2007 |
| JP | 2015-30083 A | 2/2015 |

(Continued)

OTHER PUBLICATIONS

European Search Report for corresponding international application PCT/KR2017/003319 dated Feb. 17, 2020.
(Continued)

*Primary Examiner* — Darrin D Dunn
(74) *Attorney, Agent, or Firm* — STIP Law Group, LLC

(57) ABSTRACT

The present invention relates to an apparatus and a method of automatically converting thermal displacement compensation parameters of a machine tool, which automatically convert a compensation parameter of a thermal displacement compensation equation of a machine tool so that the compensation parameter is optimized to a current thermal displacement state of the machine tool in real time based on Z-directional or Y-directional displacement data of a tool tip end of a reference tool measured by a tool measuring unit according to an operation state of the machine tool or various kinds of machine tools or thermal displacement data of the machine tool calculated by measuring a processed portion of a processed material, and temperature data measured by a temperature measuring unit, to minimize a
(Continued)

processing error according to thermal displacement and improve processing accuracy of the machine tool.

13 Claims, 11 Drawing Sheets

(58) Field of Classification Search
CPC .......... G05B 2219/49209; B23Q 23/00; B23Q 17/09; B23Q 11/00; B23Q 11/0003; B23Q 11/0007; B23Q 15/18; B23Q 17/0904; G06F 17/16
See application file for complete search history.

(56) References Cited

U.S. PATENT DOCUMENTS

| | | | | |
|---|---|---|---|---|
| 2002/0189120 | A1* | 12/2002 | Kaneda | B23Q 17/22 33/636 |
| 2006/0228465 | A1* | 10/2006 | Zurecki | C21D 1/667 427/8 |
| 2007/0145932 | A1* | 6/2007 | Kawai | G05B 19/404 318/575 |
| 2008/0215178 | A1* | 9/2008 | Senda | B23Q 15/18 700/175 |
| 2010/0152881 | A1* | 6/2010 | Ou | G05B 19/404 700/160 |
| 2012/0271439 | A1* | 10/2012 | Yamamoto | B23Q 15/18 700/73 |
| 2013/0190921 | A1* | 7/2013 | Maekawa | G05B 19/404 700/177 |
| 2013/0223946 | A1* | 8/2013 | Yamamoto | B23Q 15/18 409/80 |
| 2014/0239741 | A1* | 8/2014 | Cade | H03K 17/14 307/117 |
| 2016/0001410 | A1* | 1/2016 | Koyama | B23Q 15/12 700/170 |
| 2016/0334284 | A1* | 11/2016 | Kaplun Mucharrafille | G01K 15/00 |
| 2017/0017227 | A1* | 1/2017 | Qi | G05B 19/404 |
| 2017/0091667 | A1* | 3/2017 | Yukawa | G06N 3/0427 |
| 2017/0200987 | A1* | 7/2017 | Matsuoka | H01M 10/482 |

FOREIGN PATENT DOCUMENTS

| | | |
|---|---|---|
| KR | 1020120069056 A | 6/2012 |
| KR | 101501409 B1 | 3/2015 |
| KR | 1020150041328 A | 4/2015 |
| KR | 1020150073727 A | 7/2015 |
| WO | 2014112752 A1 | 7/2014 |

OTHER PUBLICATIONS

Korean Office Action dated Jan. 2, 2020 corresponding to Korean Application No. 10-2018-7027357.
International Search Report dated Jun. 26, 2017, corresponding to International Application No. PCT/KR2017/003319.

* cited by examiner

[FIG. 1]
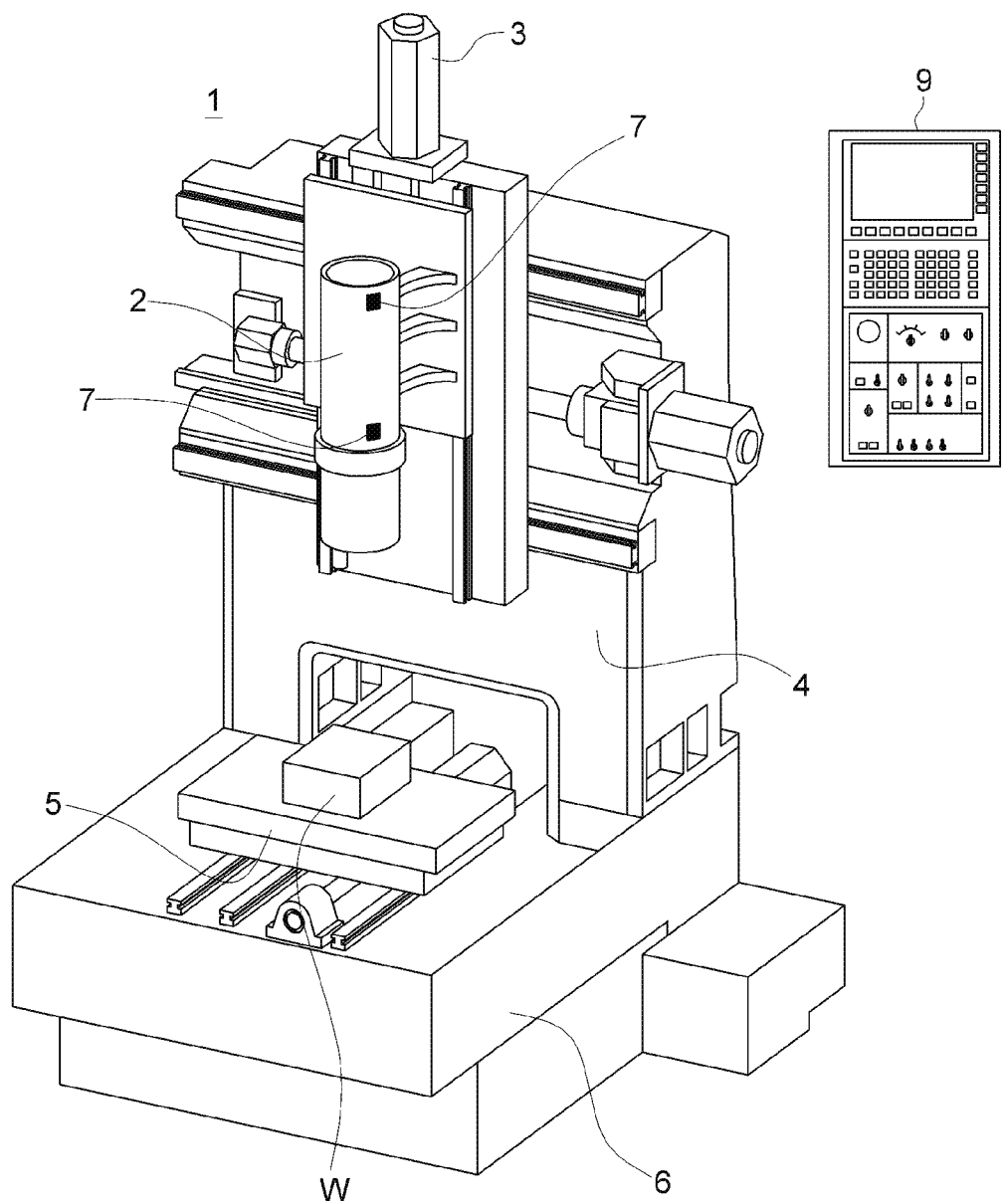

[FIG. 2]
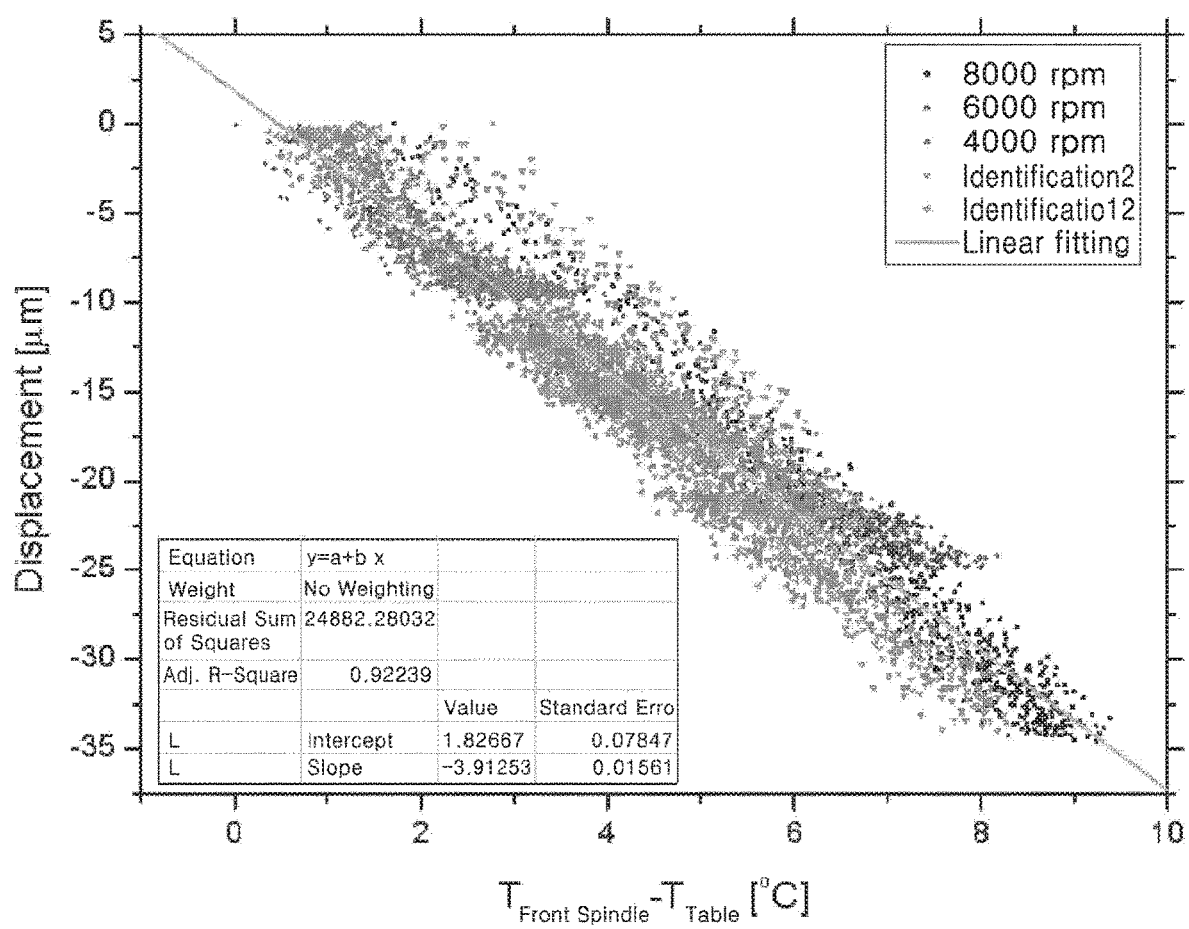

[FIG. 3]
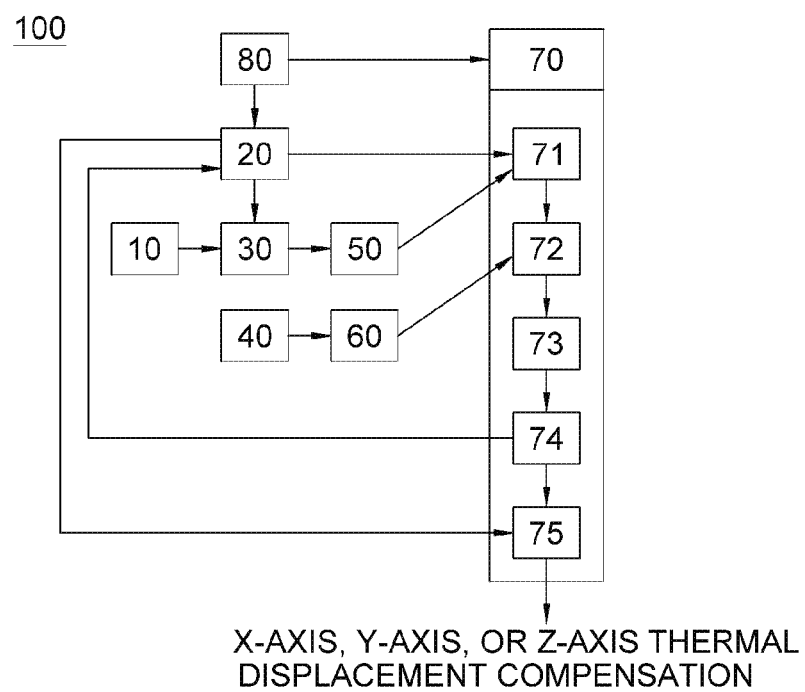
X-AXIS, Y-AXIS, OR Z-AXIS THERMAL
DISPLACEMENT COMPENSATION

[FIG. 4]

SMART THERMAL MONITORING AND CONTROL

SPINDLE HEAD COMPENSATION PARAMETER

TEMPERATURE-DEVIATION DATA TABLES

| SENSOR ID | TEMP. | TEMP OFS. | X DIRECTION C.TYP SLOPE | | Y DIRECTION C.TYP SLOPE | | Z DIRECTION C.TYP SLOPE | |
|---|---|---|---|---|---|---|---|---|
| H1 sensor | 0026.0 | 20 | X | 0.0 | X | 0.0 | LIN | 83.0 |
| H2 sensor |  | 0 | X | 0.0 | X | 0.0 | X | 0.0 |
| SM1 sensor | 0023.0 | 0 | X | 0.0 | X | 0.0 | X | 0.0 |
| SM2 sensor |  | 0 | X | 0.0 | X | 0.0 | X | 0.0 |
| S2 sensor | 0024.3 | 20 | X | 0.0 | X | 0.0 | LIN | -83.0 |

AXIS SHIFT TABLES

| INDEX | RPM | SHIFT | INDEX | RPM | SHIFT | LENGTH | DIAMETER |
|---|---|---|---|---|---|---|---|
| 0 | 0 | 0 | 5 | 50000 | 260 | +5 | 0 |
| 1 | 12500 | 20 | 6 | 0 | 0 | 0 | 0 |
| 2 | 25000 | 80 | 7 | 0 | 0 | 0 | 0 |
| 3 | 37500 | 190 | 8 | 0 | 0 | -3 | 0 |
| 4 | 45000 | 260 | 9 | 0 | 0 |  |  |

MDI   ** * ***   ALM 15:59:17

COMMON SPDL.X  STRT  STRT2.XF.AXES COOLER ALARM

[FIG. 5]

| TRIAL | H1 | S02 | S06 | S07 | S08 | Y-ERR | Y-ERR |
|---|---|---|---|---|---|---|---|
| 1 | 29.5 | 17.7 | 20.9 | 15.1 | 17.1 | 0.000 | -0.400 |
| 2 | 29.2 | 17.6 | 19.9 | 16.6 | 17.3 | 0.000 | 22.300 |
| 3 | 28.7 | 17.0 | 18.8 | 16.9 | 16.6 | 0.000 | 31.000 |
| 4 | 16.9 | 16.4 | 18.0 | 16.4 | 16.2 | 0.000 | 28.500 |
| 5 | 16.4 | 16.9 | 18.2 | 16.9 | 16.5 | 0.000 | 33.300 |
| 6 | 19.6 | 17.8 | 19.3 | 17.0 | 17.2 | 0.000 | 12.800 |
| 7 | 19.1 | 17.2 | 18.7 | 15.9 | 17.0 | 0.000 | 30.600 |
| 8 | 17.1 | 15.0 | 16.8 | 13.4 | 15.0 | 0.000 | 51.200 |
| 9 | 0.0 | 0.0 | 0.0 | 0.0 | 0.0 | 0.000 | 0.000 |
| 10 | 0.0 | 0.0 | 0.0 | 0.0 | 0.0 | 0.000 | 0.000 |

CALCULATED Y/Z-AXIS THERMAL COMPENSATION PARAMETERS 0.000 0.000 0.000 0.000 0.000 0.000 0.000 0.000
0.487 26.012 -8.691 -17.670 -1.516 0.000 0.000 0.000

1. Press BACKUP to save comp. parameters and then READY for preparation
2. TS27R CALIBRATION by O8002>> #540= 22.123 #541= -100.300 #542= -99.789
3. DIN SPECTRUM by O800(during which data for tuning is to be gathered)
4. After DIN SPECTRUM, Press TUNNING to calculate optimal comp. parameters
5. Press PRMESET to use tuned param. or RESTORE to use backuped param.

RMT ****     14:21:37   PATH1

| BACKUP | READY | TUNING | PARSET | RESTOR |

[FIG. 6]
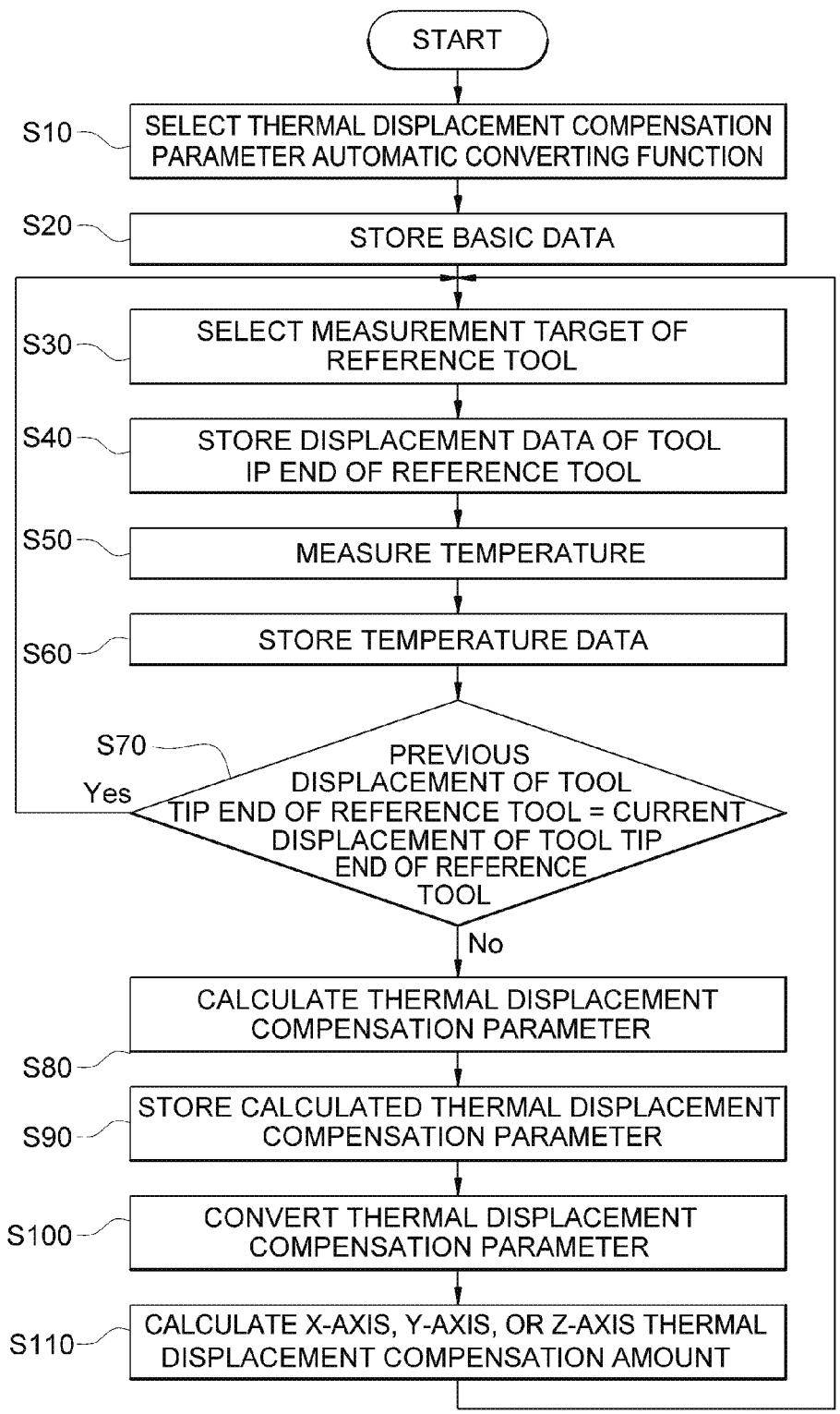

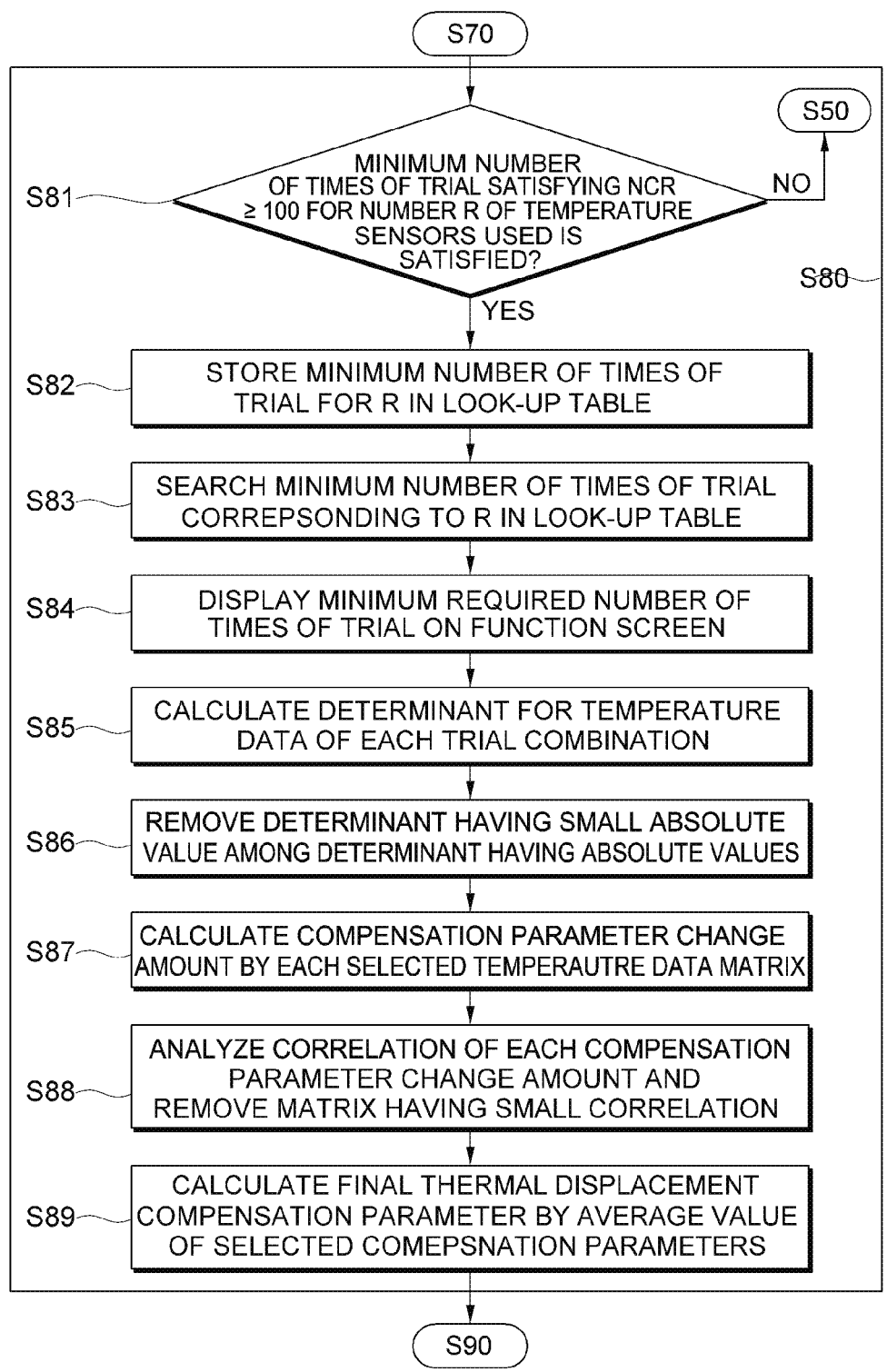
[FIG. 7]

[FIG. 8]
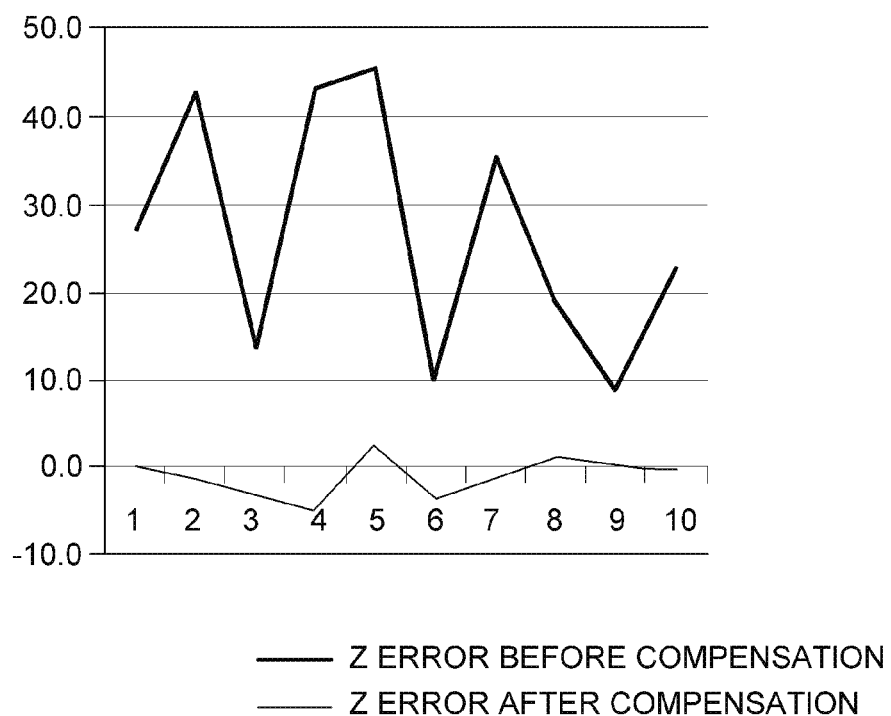

[FIG. 9]
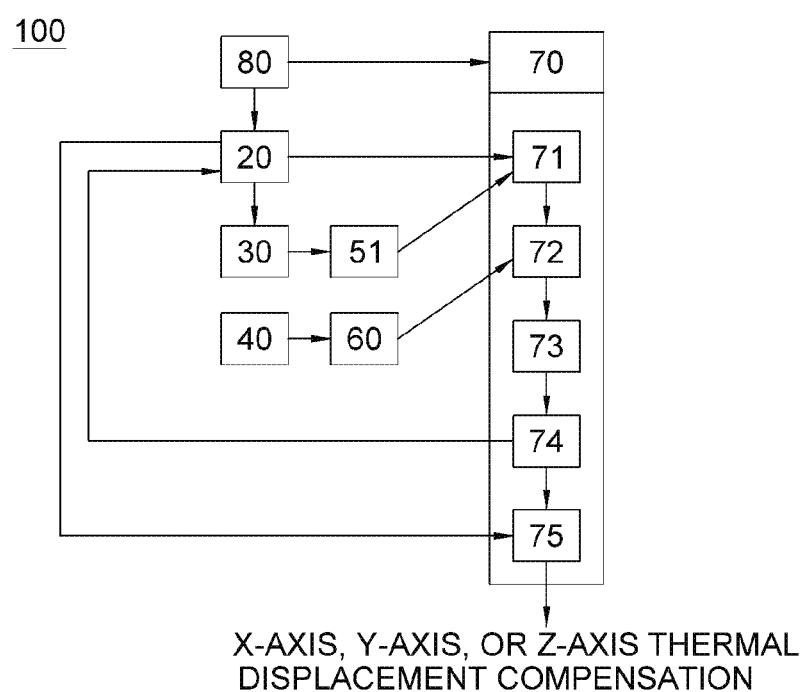

[FIG. 10]
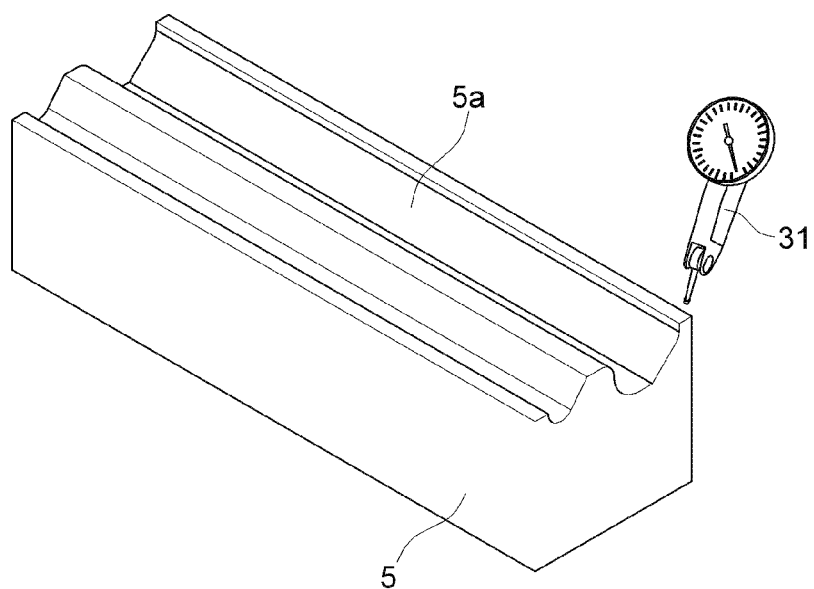

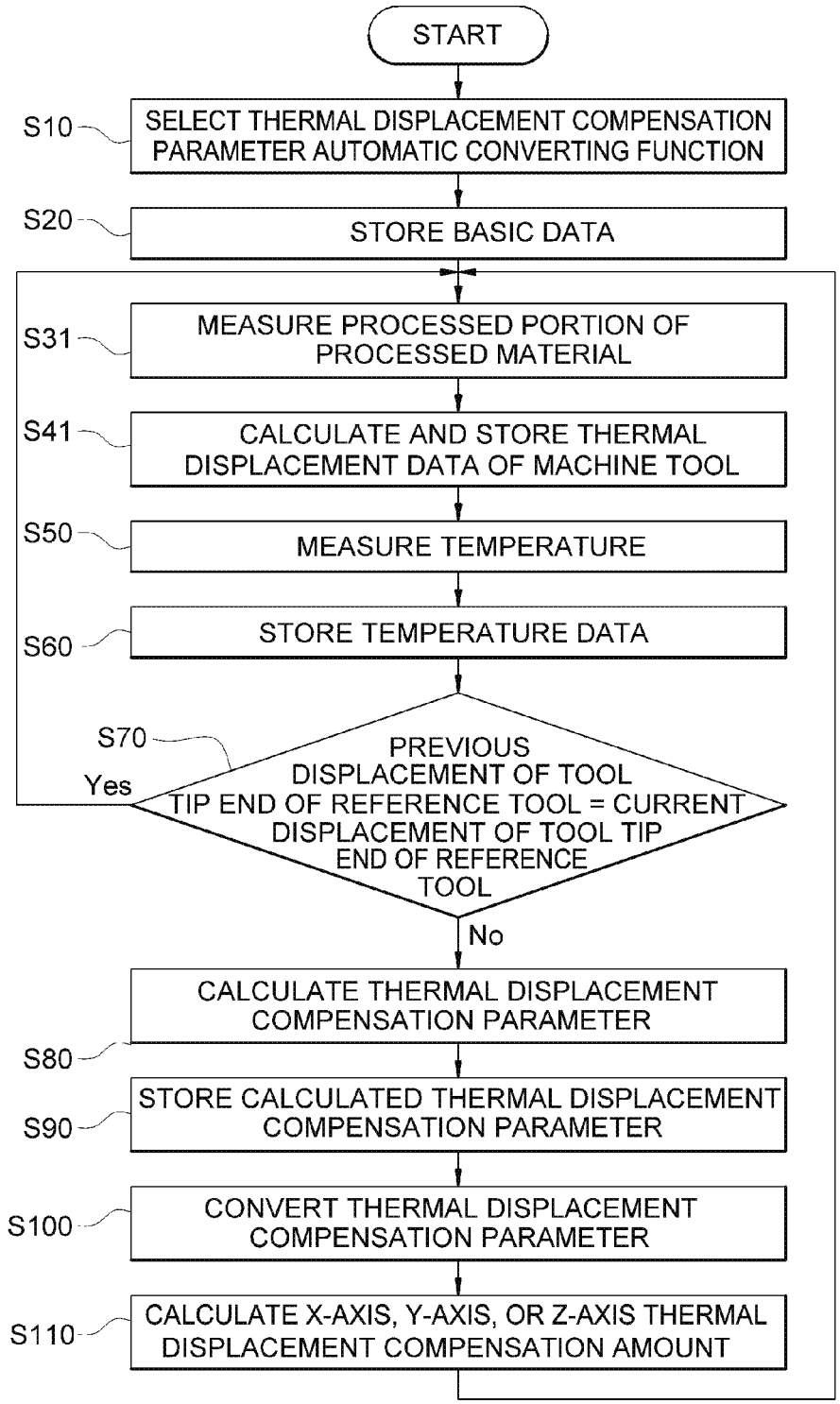
[FIG. 11]

APPARATUS AND METHOD FOR AUTOMATICALLY CONVERTING THERMAL DISPLACEMENT COMPENSATION PARAMETERS OF MACHINE TOOL

TECHNICAL FIELD

The present invention relates to an apparatus and a method of automatically converting a thermal displacement compensation parameter of a machine tool, which automatically convert a compensation parameter of a thermal displacement compensation equation of a machine tool in real time based on Z-directional or Y-directional displacement data of a tool tip end of a reference tool measured by a tool measuring unit or thermal displacement data of a machine tool calculated by measuring a processed portion of a processed material, and temperature data measured by a temperature measuring unit to improve processing accuracy.

BACKGROUND ART

Various kinds of machine tools including a turning center, a machining center, a double column type machining center, Swiss turn, an electrical discharge machine, a horizontal numerical control (NC) boring machine, and a computerized numerical control (CNC) rack are widely used for a corresponding operation in various industrial fields.

As illustrated in FIG. 1, various kinds of machine tools, which are currently generally used, include operating panels 9, to which an NC technology or a CNC technology is applied, and the operating panel 9 includes a monitor for visually displaying various function switches (or operation buttons) or operation states to a user.

Further, as illustrated in FIG. 1, in general, a main shaft 2 of a machine tool 1, a main shaft motor 3 driving the main shaft 2, a column 4 supporting the main shaft 2, a table 5, on which a workpiece W is positioned, a bed 6, and a tool mounted to a part of the main shaft 2 are mostly formed of metal.

A machine tool of the day needs to be operated at a high speed and process many products for improving productivity. Further, a machine tool of the day is required to process a workpiece with high accuracy according to the trend of miniaturization of various equipment.

In order to improve accuracy of processing a workpiece, it is necessary to minimize a geometric error or an error according to thermal deformation.

A processing error of a workpiece is primarily influenced by a location error, an angular displacement error, straightness, and perpendicularity, and the like generated by assembling states or geometric states of constitutional elements configuring a machine tool.

Most of the constitutional elements configuring the machine tool are formed of metal so that when the machine tool is operated at a high speed for a long time for improving productivity of the machine tool, thermal deformation is generated by cutting heat generated by friction between the tool and the workpiece during the processing of the workpiece, main shaft frictional heat generated by a high-speed rotation of the main shaft, frictional heat generated in a feeding shaft according to repeated feeding of the feeding shaft, convective heat generated according to a circulation of cutting oil, peripheral heat in the vicinity of the machine tool, and the like.

The thermal deformation has far more influence on a processing error of the workpiece.

Accordingly, in order to improve accuracy of processing the machine tool, it is necessary to minimize a processing error according to thermal deformation of the machine tool.

An apparatus for compensating for a thermal deformation error of a machine tool in the related art, draws, in order to minimize a processing error according to thermal deformation, a thermal displacement compensation parameter by linearizing a relation between data of the temperature measuring unit and thermal displacement error data as illustrated in FIG. 2 by mounting two temperature measuring units to an upper end portion and a lower end portion of a main shaft of one or two machine tools extracted as specimens, and calculates a thermal displacement compensation amount by using a thermal displacement compensation amount calculation equation to which the fixed thermal displacement compensation parameter are applied.

That is, the apparatus for compensating for a thermal deformation error of a machine tool in the related art calculates a thermal displacement compensation amount by the thermal displacement compensation amount calculation equation, to which the fixed thermal displacement compensation parameter extracted from the representative kind of equipment is applied without considering a characteristic of a thermal displacement error according to a change in temperature between the kinds of equipment, so that there is a problem in that a thermal displacement error is not precisely compensated for each kind of equipment and processing accuracy is decreased.

Further, it is necessary to stop a machine tool in order to calculate a new fixed thermal displacement compensation parameter according to a use period of time or a use state even within the same equipment and calculate a thermal displacement compensation parameter again, so that there is a problem in that production efficiency is decreased.

DISCLOSURE

Technical Problem

The present invention is conceived to solve the foregoing problems, and an object of the present invention is to automatically convert a compensation parameter of a thermal displacement compensation equation of the machine tool so that the compensation parameter is optimized to a current thermal displacement state of the machine tool in real time based on thermal displacement data of the machine tool measured by a tool measuring unit according to an operation state or various kinds of machine tools or calculated from a processed portion of a processed material, and temperature data measured by a temperature measuring unit to minimize a processing error according to thermal displacement and improve processing accuracy of a machine tool.

Technical Solution

In order to achieve the foregoing object, an exemplary embodiment of the present invention provides an apparatus for automatically converting a thermal displacement compensation parameter of a machine tool including an operating panel and a main shaft, to which a tool for processing a workpiece is mounted, the apparatus including: a basic thermal displacement compensation data storing unit, which stores basic data for X-axis, Y-axis, or Z-axis thermal displacement compensation; a tool measuring unit, which measures Z-directional or Y-directional displacement of a tool tip end of a reference tool; a plurality of temperature measuring units installed at a plurality of points of the machine tool; a reference tool data storing unit, which stores Z-directional or Y-directional displacement data of the tool tip end of the reference tool measured by the tool measuring unit; a temperature data storing unit, which stores temperature data measured by the plurality of temperature measuring units; and a control unit, which calculates a thermal displacement compensation parameter based on an average value of temperature data matrixes according to the number of the plurality of temperature measuring units and a Z-directional or Y-directional displacement change amount of the tool tip end of the reference tool.

Further, the apparatus may further include: a reference tool measurement target selecting unit, which selects a measurement target of the reference tool measured by the tool measuring unit; and a thermal displacement compensation parameter automatic converting function setting unit, in which when the reference tool measurement target selecting unit selects a length as the measurement target of the reference tool measured by the tool measurement unit, a Z-axis thermal displacement compensation parameter may be automatically converted, and when the reference tool measurement target selecting unit selects a diameter as the measurement target of the reference tool measured by the tool measurement unit, an X-axis or Y-axis thermal displacement compensation parameter may be automatically converted.

Further, the control unit may include: a reference tool tip end Z-directional or Y-directional displacement change determining unit, which determines whether a Z-directional or Y-directional displacement value of the tool tip end of the reference tool stored in the basic thermal displacement compensation data storing unit corresponds to a Z-directional or Y-directional displacement value of the tool tip end of the reference tool stored in the reference tool data calculating and storing unit; a compensation parameter calculating unit, which when the Z-directional or Y-directional displacement of the tool tip end of the reference tool is changed as a result of the determination by the reference tool tip end Z-directional or Y-directional displacement change determining unit, calculates a thermal displacement compensation parameter according to the changed Z-directional or Y-directional displacement value of the tool tip end of the reference tool and a temperature; a compensation parameter storing unit, which stores the compensation parameter calculated by the compensation parameter calculating unit; a compensation parameter converting unit, which converts the compensation parameter of the X-axis, Y-axis, or Z-axis thermal displacement compensation equation stored in the basic thermal displacement compensation data storing unit with the compensation parameter stored in the compensation parameter storing unit; and a thermal displacement compensation amount calculating unit, which calculates a thermal displacement compensation amount by the thermal displacement compensation equation, to which the compensation parameter converted by the compensation parameter converting unit is applied.

Further, the compensation parameter calculating unit may calculate the compensation parameter by Equation (5).

$$\begin{pmatrix} \Delta_1 \\ \Delta_2 \\ \dots \\ \Delta_n \end{pmatrix} = \begin{pmatrix} b_{11}b_{12} \dots b_{1n} \\ b_{21}b_{22} \dots b_{2n} \\ \dots \\ b_{n1}b_{n2} \dots b_{nn} \end{pmatrix}^{-1} \begin{pmatrix} -K_1 \\ -K_2 \\ \dots \\ -K_n \end{pmatrix} \quad \text{[Equation (5)]}$$

Herein, $\Delta_n$ represents a compensation parameter change amount (error amount) for $n^{th}$ temperature sensor, $b_{hn}$ represents temperature data of the $n^{th}$ temperature sensor measured in the $h^{th}$ tool measurement order, and $K_n$ represents a Z-directional or Y-directional displacement change amount of a tool tip end of a reference tool measured in the $n^{th}$ tool measurement order.

Further, a matrix for the $n^{th}$ temperature data in the $h^{th}$ tool measurement order may be obtained by calculating mCn that is a temperature data combination corresponding to the total number m of times of a measurement (measurement of temperature sensor data and a reference tool change amount) and the number n of the plurality of temperature measuring units, calculating determinants of the plurality of temperature data matrixes, and removing the calculated determinant value having an absolute value of 0, or one or more calculated determinant values having small absolute values among the absolute values of the calculated determinant values of the plurality of temperature data matrixes in order.

Further, a compensation parameter matrix may be calculated by substituting the temperature data matrix corresponding to the non-removed determinants having large absolute values to Equation (5), the compensation parameter matrixes having a small correlation through a correlation analysis of the compensation parameter matrix may be excluded, and a final thermal displacement compensation parameter may be calculated by using an arithmetic mean or a weighted average of the selected compensation parameter matrixes.

Further, the thermal displacement compensation amount calculating unit may calculate the thermal displacement compensation amount by Equation (6).

$$(a_1+\Delta_1)(t_1-T_1)+(a_2+\Delta_2)(t_2-T_2)+ \dots +(a_n+\Delta_n)(t_n-T_n)=\text{thermal displacement compensation amount} \quad \text{[Equation (6)]}$$

Herein, $a_n$ indicates the $n^{th}$ compensation parameter, $\Delta_n$ indicates a compensation parameter change amount for $n^{th}$ temperature data, $t_n$ indicates $n^{th}$ temperature data, and $T_n$ indicates $n^{th}$ temperature offset.

In the meantime, another exemplary embodiment of the present invention provides a method of automatically converting a thermal displacement compensation parameter of a machine tool, the method including: selecting, by a thermal displacement compensation parameter automatic converting function selecting unit, a thermal displacement compensation parameter automatic converting function; storing basic data for X-axis, Y-axis, or Z-axis thermal displacement compensation in a basic thermal displacement compensation data storing unit; selecting, by a reference tool measurement target selecting unit, Z-directional or Y-directional displacement of a tool tip end that is a measurement target of a reference tool measured by a tool measuring unit; storing Z-directional or Y-directional displacement data of the tool tip end of the reference tool measured by the tool measuring unit in a reference tool data storing unit; measuring a temperature by a temperature measuring unit; storing temperature data measured by the temperature measuring unit in a temperature data storing unit; determining by, a reference tool tip end Z-directional or Y-directional displacement change determining unit, whether a previous Z-directional or Y-directional displacement value of the tool tip end of the reference tool stored in the basic thermal displacement compensation data storing unit corresponds to a current Z-directional or Y-directional displacement value of the tool tip end of the reference tool stored in the reference tool data storing unit; when the Z-directional or Y-directional displacement of the tool tip end of the reference tool is changed, calculating a thermal displacement compensation parameter according to an average value of temperature data matrixes according to the number of a plurality of temperature measuring units and a Z-directional or Y-directional displacement change amount of the tool tip end; storing the thermal displacement compensation parameter calculated by the compensation parameter calculating unit in a compensation parameter storing unit; and converting, by a compensation parameter converting unit, a thermal displacement compensation parameter of an X-axis, Y-axis, or Z-axis thermal displacement compensation equation stored in the basic thermal displacement compensation data storing unit with the thermal displacement compensation parameter stored in the compensation parameter storing unit.

Further, the calculating of the thermal displacement compensation parameter may include calculating mCn that is a temperature data combination corresponding to the number of the plurality of temperature measuring units, calculating determinants of the plurality of temperature data matrixes, removing the calculated determinant value having an absolute value of 0, or one or more calculated determinant values having small absolute values among the absolute values of the calculated determinant values of the plurality of temperature data matrixes in order, and obtaining a compensation parameter matrix by substituting the selected determinant values of the plurality of temperature data matrixes by Equation (5) below.

$$\begin{pmatrix} \Delta_1 \\ \Delta_2 \\ \dots \\ \Delta_n \end{pmatrix} = \begin{pmatrix} b_{11} b_{12} & \dots & b_{1n} \\ b_{21} b_{22} & \dots & b_{2n} \\ & \dots & \\ b_{n1} b_{n2} & \dots & b_{nn} \end{pmatrix}^{-1} \begin{pmatrix} -K_1 \\ -K_2 \\ \dots \\ -K_n \end{pmatrix} \quad \text{[Equation (5)]}$$

A predetermined number of compensation parameter matrixes may be excluded from the compensation parameter matrixes having a small correlation through a correlation analysis of the compensation parameter matrix, and a final thermal displacement compensation parameter may be calculated by using an arithmetic mean or a weighted average of the selected compensation parameter matrixes.

The method may further include, after the converting of the compensation parameter of the X-axis, Y-axis, or Z-axis thermal displacement compensation equation, calculating, by a thermal displacement compensation amount calculating unit, an X-axis, Y-axis, or Z-axis thermal displacement compensation amount by applying the compensation parameter converted by the compensation parameter converting unit.

In the meantime, still another exemplary embodiment of the present invention provides an apparatus for automatically converting a thermal displacement compensation parameter of a machine tool including an operating panel and a main shaft, to which a tool for processing a workpiece is mounted, the apparatus including: a basic thermal displacement compensation data storing unit, which stores basic data for X-axis, Y-axis, or Z-axis thermal displacement compensation; an indicator, which is clapped to the main shaft and measures a depth or a width of a processed portion of a processed material; a plurality of temperature measuring units installed at a plurality of points of the machine tool; a reference displacement data calculating and storing unit, which calculates thermal displacement data of the machine tool from the processed portion measured by the indicator and stores the calculated data; a temperature data storing unit, which stores temperature data measured by the plurality of temperature measuring units; and a control unit, which calculates a thermal displacement compensation parameter based on an average value of temperature data matrixes according to the number of plurality of temperature measuring units and the Z-directional or Y-directional displacement change amount of a tool tip end of a reference tool.

Further, the control unit may include: a reference tool tip end Z-directional or Y-directional displacement change determining unit, which determines whether a Z-directional or Y-directional displacement value of the tool tip end of the reference tool stored in the basic thermal displacement compensation data storing unit corresponds to a Z-directional or Y-directional displacement value of the tool tip end of the reference tool stored in the reference tool data calculating and storing unit; a compensation parameter calculating unit, which when the Z-directional or Y-directional displacement of the tool tip end of the reference tool is changed as a result of the determination by the reference tool tip end Z-directional or Y-directional displacement change determining unit, calculates a thermal displacement compensation parameter according to the changed Z-directional or Y-directional displacement value of the tool tip end of the reference tool and a temperature; a compensation parameter storing unit, which stores the compensation parameter calculated by the compensation parameter calculating unit; a compensation parameter converting unit, which converts a compensation parameter of the X-axis, Y-axis, or Z-axis thermal displacement compensation equation stored in the basic thermal displacement compensation data storing unit with the compensation parameter stored in the compensation parameter storing unit; and a thermal displacement compensation amount calculating unit, which calculates a thermal displacement compensation amount by a thermal displacement compensation equation, to which the compensation parameter converted by the compensation parameter converting unit is applied.

Further, the compensation parameter calculating unit may calculate the compensation parameter by Equation (5).

$$\begin{pmatrix} \Delta_1 \\ \Delta_2 \\ \dots \\ \Delta_n \end{pmatrix} = \begin{pmatrix} b_{11} b_{12} & \dots & b_{1n} \\ b_{21} b_{22} & \dots & b_{2n} \\ & \dots & \\ b_{n1} b_{n2} & \dots & b_{nn} \end{pmatrix}^{-1} \begin{pmatrix} -K_1 \\ -K_2 \\ \dots \\ -K_n \end{pmatrix} \quad \text{[Equation (5)]}$$

$\Delta_n$: compensation parameter change amount (error amount) for $n^{th}$ temperature sensor $b_{hn}$: temperature data of $n^{th}$ temperature sensor measured in $h^{th}$ tool measurement order $K_n$: Z-directional or Y-directional displacement change amount of tool tip end of reference tool measured in $n^{th}$ tool measurement order Further, a matrix for the $n^{th}$ temperature data in the $h^{th}$ tool measurement order may be obtained by calculating mCn that is a temperature data combination corresponding to the total number m of times of a measurement (measurement of temperature sensor data and a reference tool change amount) and the number n of the plurality of temperature measuring units, calculating determinants of the plurality of temperature data matrixes, removing the calculated determinant value having an absolute value of 0, or one or more calculated determinant values having small absolute values among the absolute values of the calculated determinant values of the plurality of temperature data matrixes in order, calculating a compensation parameter matrix by substituting the temperature data matrix corresponding to the non-removed determinants having large absolute values to Equation (5), excluding compensation parameter matrixes having a small correlation through a correlation analysis of the compensation parameter matrix, and calculating a final thermal displacement compensation parameter by using an arithmetic mean or a weighted average of the selected compensation parameter matrixes.

Further, the thermal displacement compensation amount calculating unit may calculate the thermal displacement compensation amount by Equation (6).

$$\frac{(a_1+\Delta_1)(t_1-T_1)+(a_2+\Delta_2)(t_2-T_2)+\ldots+(a_n+\Delta_n)}{(t_n-T_n)} = \text{thermal displacement compensation amount} \quad [\text{Equation (6)}]$$

$a_n$: $n^{th}$ compensation parameter
$\Delta_n$: compensation parameter change amount for $n^{th}$ temperature data
$t_n$: $n^{th}$ temperature data
$T_n$: $n^{th}$ temperature offset Advantageous Effects The apparatus and the method of automatically converting a thermal displacement compensation parameter of a machine tool according to the present invention are capable of accurately compensating for a thermal displacement error according to a current processing state of a machine tool or various kinds of machine tools, thereby having an effect in that processing accuracy is improved.

Further, the apparatus and the method of automatically converting a thermal displacement compensation parameter of a machine tool according to the present invention are capable of converting a thermal displacement compensation parameter according to an equipment state within the same equipment in real time and are applicable to various kinds of machine tools, thereby having an effect in that time and cost consumed for calculating a thermal displacement compensation parameter are decreased.

Further, the apparatus and the method of automatically converting a thermal displacement compensation parameter of a machine tool according to the present invention are capable of maximizing processing time of a machine tool by minimizing time for calculating a thermal displacement compensation parameter, thereby having an effect in that productivity efficiency of the machine tool is improved.

DESCRIPTION OF DRAWINGS

FIG. 1 is a diagram illustrating an apparatus for compensating for thermal displacement of a machine tool and an operating panel in the related art.

FIG. 2 is a graph for drawing a thermal displacement compensation equation for compensating thermal displacement in the machine tool in the related art.

FIG. 3 is a block diagram of an apparatus for automatically converting a thermal displacement compensation parameter of a machine tool according to an exemplary embodiment of the present invention.

FIG. 4 is a diagram illustrating a screen of an operating panel, in which a compensation parameter is calculated for automatically converting a thermal displacement compensation parameter according to the exemplary embodiment of the present invention.

FIG. 5 is a diagram illustrating a screen of the operating panel for performing operations before FIG. 4 according to the exemplary embodiment of the present invention.

FIG. 6 is a flowchart of a method of automatically converting a thermal displacement compensation parameter of a machine tool according to an exemplary embodiment of the present invention.

FIG. 7 is a flowchart, in which operation S80 illustrated in FIG. 6 is specified.

FIG. 8 is a graph of performance predicted when a thermal displacement compensation parameter is applied according to the exemplary embodiment of the present invention.

FIG. 9 is a block diagram of an apparatus for automatically converting a thermal displacement compensation parameter of a machine tool according to another exemplary embodiment of the present invention.

FIG. 10 is a diagram schematically illustrating a measurement of a processed portion of a processed material according to another exemplary embodiment of the present invention.

FIG. 11 is a flowchart of a method of automatically converting a thermal displacement compensation parameter of a machine tool according to another exemplary embodiment of the present invention.

BEST MODE FOR CARRYING OUT THE INVENTION

Hereinafter, exemplary embodiments of the present invention will be described in detail with reference to the accompanying drawings.

Unless a specific definition is given, all of the terms in the present specification have the same meanings as those of the terms understood by those skilled in the art, and when the term used in the present specification conflicts with a general meaning of the term in the art, the term follows the definition used in the present specification.

However, the invention to be described below is for the purpose of describing an exemplary embodiment of the present invention, but does not limit the scope of the present invention, and like reference numerals indicate like elements throughout the specification.

FIG. 3 is a block diagram of an apparatus for automatically converting a thermal displacement compensation parameter of a machine tool according to an exemplary embodiment of the present invention, FIG. 4 is a diagram illustrating a screen of an operating panel, in which a compensation parameter is calculated for automatically converting a thermal displacement compensation parameter according to the exemplary embodiment of the present invention, FIG. 5 is a diagram illustrating a screen of the operating panel for performing operations before FIG. 4 according to the exemplary embodiment of the present invention, FIG. 6 is a flowchart of a method of automatically converting a thermal displacement compensation parameter of a machine tool according to an exemplary embodiment of the present invention, FIG. 7 is a flowchart, in which operation S80 illustrated in FIG. 6 is specified, and FIG. 8 is a graph of performance predicted when a thermal displacement compensation parameter is applied according to the exemplary embodiment of the present invention.

Further, FIG. 9 is a block diagram of an apparatus for automatically converting a thermal displacement compensation parameter of a machine tool according to another exemplary embodiment of the present invention, FIG. 10 is a diagram schematically illustrating a measurement of a processed portion of a processed material according to another exemplary embodiment of the present invention, and FIG. 11 is a flowchart of a method of automatically converting a thermal displacement compensation parameter of a machine tool according to another exemplary embodiment of the present invention.

An apparatus 100 for automatically converting a thermal displacement compensation parameter of a machine tool according to an exemplary embodiment will be described with reference to FIG. 3.

The apparatus 100 for automatically converting a thermal displacement compensation parameter of a machine tool according to the exemplary embodiment of the present invention may include a basic thermal displacement compensation data storing unit 20, a tool measuring unit 30, a temperature measuring unit 40, a reference tool data storing unit 50, a temperature data storing unit 60, and a control unit 70.

Further, the apparatus 100 for automatically converting a thermal displacement compensation parameter of a machine tool according to the exemplary embodiment of the present invention may further include a reference tool measurement target selecting unit 10 and a thermal displacement compensation parameter automatic converting function setting unit 80.

The present invention is not essentially limited thereto, and according to the exemplary embodiment of the present invention, the thermal displacement compensation parameter automatic converting function setting unit 80 may be installed in the form of a switch or a button in a part of an operating panel 9.

When the thermal displacement compensation parameter automatic converting function setting unit 80 does not select a thermal displacement compensation parameter automatic converting function, a function of the apparatus for automatically converting a thermal displacement compensation parameter according to the present invention may not be operated.

The basic thermal displacement compensation data storing unit 20 may store basic data for compensating for thermal displacement in an X-axis, a Y-axis, or a Z-axis.

In the basic thermal displacement compensation data storing unit 20, data about a length and a diameter of a reference tool in a standard state before thermal displacement according to processing of a workpiece is generated, temperature offset ($T_n$) data, a basic thermal displacement compensation amount parameter ($a_n$), and a basic thermal displacement compensation amount calculation equation are stored.

The basic thermal displacement compensation amount calculation equation may be expressed by Equation (1) below.

Thermal displacement compensation amount=$(a_1)$
$(t_1 T_1)+(a_2)(t_2-T_2)+ \ldots +(a_n)(t_n-T_n)$     [Equation (1)]

$a_n$: $n^{th}$ compensation parameter
$t_n$: $n^{th}$ temperature data
$T_n$: $n^{th}$ temperature offset The present invention is not essentially limited thereto, and according to the exemplary embodiment of the present invention, the reference tool measurement target selecting unit 10 may be installed in the form of a switch or a button in a part of the operating panel 9.

Herein, the reference tool measurement target selecting unit 10 selects a measurement target of a reference tool measured by the tool measuring unit 30.

Further, the reference tool measurement target selecting unit 10 may perform a function of determining whether to measure a length of the reference tool or a diameter of the reference tool by the tool measuring unit 30.

Accordingly, when the reference tool measurement target selecting unit 10 selects the length as the measurement target of the reference tool measured by the tool measuring unit 30, the Z-axis thermal displacement compensation parameter is automatically converted, and when the reference tool measurement target selecting unit 10 selects the diameter as the measurement target of the reference tool measured by the tool measuring unit 30, the X-axis or Y-axis thermal displacement compensation parameter is automatically converted.

When the measurement target of the reference tool is selected by the reference tool measurement target selecting unit 10, the tool measuring unit 30 measures Z-directional or Y-directional displacement of a tool tip end of the reference tool.

Herein, the Z-directional or Y-directional displacement of the tool tip end of the reference tool may be a displacement amount of the length or the diameter of the reference tool.

The tool measuring unit 30 may be the form of a separated component for securing a processing space, but may be fixedly installed in a part of a machine tool 1 as necessary.

In the meantime, according to another exemplary embodiment of the present invention, a thermal displacement state change value of a machine tool may also be calculated from a processed material, without directly measuring the reference tool by the reference tool measurement target selecting unit 10 and the tool measuring unit 30 as described above.

Referring to FIGS. 9 and 10, a machine tool according to another exemplary embodiment of the present invention may include an indicator 31 and a machine tool thermal displacement data calculating and storing unit 51, instead of the reference tool measurement target selecting unit 10 and the tool measuring unit 30.

The indicator 31 may be clapped to a main shaft 2 (see FIG. 1), and may measure a depth or an area of a processed portion 5a of a processed material 5. The indicator 31 is shifted while being clamped to the main shaft, so that the indicator 31 may also detect a coordinate of each processed region when the processed portion 5a is measured.

Information about the processed region of the processed portion 5a calculated by the indicator 31 may be transferred to the machine tool thermal displacement data calculating and storing unit 51, so that a change amount according to thermal displacement of the machine tool for each coordinate may be calculated and stored.

The temperature measuring unit 40 may be installed in a part of the machine tool 1. The plurality of temperature measuring units may be installed at a plurality of points, that is, an upper end and a lower end of the main shaft, a column, a main shaft motor, a table, and a bed, of the machine tool as necessary.

The present invention is not essentially limited thereto, and according to the exemplary embodiment of the present invention, the temperature measuring unit 40 may be formed of a temperature measuring unit and a temperature measuring unit interface unit.

The reference tool data storing unit 50 may be installed in a part (more particularly, a part of an internal memory of a numerical control (NC) device) of the operating panel 9, and may store Z-directional or Y-directional displacement data of the tool tip end of the reference tool measured by the tool measuring unit 30.

The temperature data storing unit 60 may be installed in a part (more particularly, a part of the internal memory of the numerical control (NC) device) of the operating panel 9, and may store temperature data measured by the plurality of temperature measuring units 40.

The control unit 70 may be installed in a part of the operating panel 9.

In the state of the thermal displacement, the thermal displacement compensation parameter is calculated again by using the data of the length and the diameter of the reference tool selected by the reference tool measurement target selecting unit 10, and when the thermal displacement compensation parameter is changed, the reference tool position becomes a reference position in the state of the thermal displacement, so that the thermal displacement compensation parameter is calculated so that the Z-directional or Y-directional displacement of the tool tip end of the reference tool is always constant with respect to the reference position.

Further, even when the thermal displacement of the machine tool is calculated based on the processed material 5 according to another exemplary embodiment of the present invention, the indicator 31 is shifted by the main shaft 2, so that the thermal displacement compensation parameter may be calculated so that the displacement is always constant with respect to the reference position.

The control unit 70 may include a reference tool tip end Z-directional or Y-directional displacement change determining unit 71, a compensation parameter calculating unit 72, a compensation parameter storing unit 73, a compensation parameter converting unit 74, and a thermal displacement compensation amount calculating unit 75.

The reference tool tip end Z-directional or Y-directional displacement change determining unit 71 may determine whether a Z-directional or Y-directional displacement value of the tool tip end of the reference tool before the thermal displacement is generated and stored in the basic thermal displacement compensation data storing unit 20 corresponds to a current Z-directional or Y-directional displacement value of the tool tip end of the reference tool stored in the reference tool data storing unit 50.

When the current Z-directional or Y-directional displacement value of the tool tip end of the reference tool measured by the tool measuring unit 30 does not correspond to the Z-directional or Y-directional displacement value of the tool tip end of the reference tool before the processing and is changed, it may be assumed that there is an error or a change in the basic thermal displacement compensation amount parameter stored in the basic thermal displacement compensation data storing unit 20.

That is, in this case, it may be assumed that a thermal displacement compensation error is generated.

As described above, when the Z-directional or Y-directional displacement value of the tool tip end of the reference tool is changed, the apparatus 10 for automatically converting a thermal displacement compensation parameter according to the exemplary embodiment calculates a thermal displacement compensation parameter based on the changed Z-directional or Y-directional displacement value of the tool tip end of the reference tool and the temperature data, and calculates a thermal displacement error compensation amount by a thermal displacement compensation amount calculation equation, to which the changed thermal displacement compensation parameter is applied, to perform the thermal displacement compensation, so that it is possible to accurately compensate for the thermal displacement error.

That is, in order to compensate for the thermal displacement error of the machine tool in the current state, a thermal displacement compensation amount calculation equation, to which the changed thermal displacement compensation parameter is applied, needs to be applied as represented in Equation (2) below.

$$(a_1+\Delta_1)(t_1-T_1)+(a_2+\Delta_2)(t_2-T_2)+ \ldots +(a_n+\Delta_n)(t_n-T_n)=\text{thermal displacement compensation amount}-K_n \quad \text{[Equation (2)]}$$

$a_n$: $n^{th}$ compensation parameter
$\Delta_n$: Compensation parameter change amount for $n^{th}$ temperature data
$t_n$: $n^{th}$ temperature data
$T_n$: $n^{th}$ temperature offset
$K_n$: Z-directional or Y-directional displacement change amount of tool tip end of $n^{th}$ reference tool When Equation (2) is subtracted from Equation 1), Equation (3) may be drawn.

$$\Delta_1(t_1-T_1)+\Delta_2(t_2-T_2)+ \ldots +\Delta_n(t_n-T_n)=-K_n \quad \text{[Equation (3)]}$$

$\Delta_n$: Compensation parameter change amount for $n^{th}$ temperature data
$t_n$: $n^{th}$ temperature data
$T_n$: $n^{th}$ temperature offset
$K_n$: Z-directional or Y-directional displacement change amount of tool tip end of $n^{th}$ reference tool In Equation (3), when it is assumed that $(t_n-T_n)$ is $b_{hn}$ (a matrix for the $n^{th}$ temperature data in the $h^{th}$ tool measurement order), a matrix represented by Equation (4) below may be drawn.

$$\begin{pmatrix} b_{11}b_{12} \ldots b_{1n} \\ b_{21}b_{22} \ldots b_{2n} \\ \ldots \\ b_{n1}b_{n2} \ldots b_{nn} \end{pmatrix} \begin{pmatrix} \Delta_1 \\ \Delta_2 \\ \ldots \\ \Delta_n \end{pmatrix} = \begin{pmatrix} -K_1 \\ -K_2 \\ \ldots \\ -K_n \end{pmatrix} \quad \text{[Equation (4)]}$$

$\Delta_n$: Compensation parameter change amount for $n^{th}$ temperature data
$b_{hn}$: Matrix for $n^{th}$ temperature data in $h^{th}$ tool measurement order
$K_n$: Z-directional or Y-directional displacement change amount of tool tip end of $n^{th}$ reference tool In Equation (4), when the $b_{hn}$ side is transposed to the right hand side, Equation (5) below may be drawn.

$$\begin{pmatrix} \Delta_1 \\ \Delta_2 \\ \ldots \\ \Delta_n \end{pmatrix} = \begin{pmatrix} b_{11}b_{12} \ldots b_{1n} \\ b_{21}b_{22} \ldots b_{2n} \\ \ldots \\ b_{n1}b_{n2} \ldots b_{nn} \end{pmatrix}^{-1} \begin{pmatrix} -K_1 \\ -K_2 \\ \ldots \\ -K_n \end{pmatrix} \quad \text{[Equation (5)]}$$

$\Delta_n$: Compensation parameter change amount for (error amount) for $n^{th}$ temperature sensor
$b_{hn}$: Temperature data of $n^{th}$ temperature sensor measured in $h^{th}$ tool measurement order
$K_n$: Z-directional or Y-directional displacement change amount of tool tip end of reference tool measured in $n^{th}$ tool measurement order One corresponding compensation parameter exists in every temperature sensor, so that when the n temperature sensors are mounted, the number of compensation parameters is n, and in order to calculate the change amounts (the $\Delta_n$ matrix of Equation (5)) of the n compensation parameters, an n×n temperature data matrix (the $b_{nn}$ matrix of Equation (5)) and an n×1 reference tool tip end Z-directional or Y-directional displacement change amount matrix (Kn matrix of Equation (5)) are required.

That is, in the case of equipment mounted with the n temperature sensors, it is necessary to measure the tool n times in order to calculate the change amount (error amount) for the n compensation parameters.

However, when the compensation parameter change amount (error amount) is calculated by using only the n elements of measurement data (tool and temperature data), independency between the measurement data deteriorates, so that there may be a problem in a result of the calculation.

In order to obtain n values, n linear independent equations are required, and it may be considered that the foregoing case is similar to the case where the smaller equations are given.

That is, when the matrix of Equation (5) is created by using the n elements of measurement data, linear independency between rows of the matrix deteriorates, so that it may be difficult to calculate an inverse matrix of the $b_{nn}$ matrix required for calculating Equation (5).

Accordingly, it is necessary to form the matrix of Equation (5) by performing the tool measurement m times, which is larger than n times, and selecting n elements of measurement data having excellent independency among m elements of measurement data.

When the tool measurement is performed m times, which is larger than n times, the bnn matrix that is the temperature data matrix of Equation (5) is m×n, and Equation (5) needs to be calculated by creating an n×n bnn matrix by selecting n rows having excellent linear independency among the m rows.

The number of cases available when the n elements of data are selected from the m elements of measurement data may be first obtained through a combination mCn. That is, mCn n×n matrixes (the bnn matrixes of Equation (5)) may be created by selecting n elements of data from the m elements of measurement data.

A determinant absolute value of each matrix is calculated in order to select a matrix having excellent linear independency between the rows among the mCn number of n×n matrixes (bnn matrixes), and the p number of n×n matrixes having the large determinant absolute value are substituted to Equation (5) to calculate a change amount (the $\Delta_n$ matrix of Equation (5)) of each compensation parameter.

A correlation analysis is performed on the p calculated $\Delta_n$ matrixes, and a procedure of filtering by the correlation analysis, in which the $\Delta_n$ matrix having the deteriorating correlation is destroyed, is performed.

A weighted average for q (q≤p) $\Delta_n$ matrixes is calculated by using the determinant absolute value of the corresponding bnn matrix after the filtering by the correlation analysis as a weighting factor, and the calculated weighted average is applied to Equation (6) below as a final change amount of the compensation parameter (the $\Delta_n$ matrix of Equation (5)).

As described above, in order to accurately compensate for the thermal displacement error of the machine tool and improve processing accuracy, the compensation parameter calculating unit 72 calculates the thermal displacement compensation parameter changed according to the changed Z-directional or Y-directional displacement value of the tool tip end of the reference tool and the current temperature measured by the temperature measuring unit 40 by Equation (5).

The compensation parameter calculated by the compensation parameter calculating unit 72 by Equation (5) is stored in the compensation parameter storing unit 73.

The compensation parameter converting unit 74 converts the compensation parameter of the X-axis, Y-axis, or Z-axis thermal displacement compensation equation stored in the basic thermal displacement compensation data storing unit 20 with the compensation parameter stored in the compensation parameter storing unit 73.

The thermal displacement compensation amount calculating unit 75 calculates an X-axis, Y-axis, or Z-axis thermal displacement compensation amount by the thermal displacement compensation equation of Equation (6) below, to which the compensation parameter converted by the compensation parameter converting unit 74 is applied.

$$(a_1+\Delta_1)(t_1-T_1)+(a_2+\Delta_2)+ \ldots +(a_n+\Delta_n)(t_n-T_n)=\text{thermal displacement compensation amount} \quad \text{[Equation (6)]}$$

$a_n$: $n^{th}$ compensation parameter
$\Delta_n$: Compensation parameter change amount for $n^{th}$ temperature data
$t_n$: $n^{th}$ temperature data
$T_n$: $n^{th}$ temperature offset That is, the thermal displacement compensation amount calculating unit 75 may calculate the thermal displacement compensation amount, to which the current temperature state of the machine tool is reflected in real time, by Equation (6) to improve processing accuracy of the machine tool.

The automatic conversion of a thermal displacement compensation parameter and a Z-axis thermal displacement compensation amount when the Z-axis compensation is performed by adopting the apparatus for automatically converting a thermal displacement compensation parameter of the present invention will be described with reference to FIG. 4.

In FIG. 4, a detection unit (du) means a compensation unit as position resolution of NC or computerized numerical control (CNC), and is set to 0.1 μm in an exemplary embodiment of the present invention.

In FIG. 4, the first H1 temperature measuring unit is a temperature measurement unit mounted to a head body of the main shaft and is 26° C. ($t_1$) in FIG. 4, and S2 is a temperature measurement unit mounted to the bed and is 24.3° C. ($t_2$) in FIG. 4. In FIG. 4, both the temperature offsets $T_1$ and $T_2$ are 20° C. In FIG. 4, $a_1$ that is a compensation parameter (in this exemplary embodiment, a unit of the compensation parameter is du/° C.) indicated by a slope is 83, and $a_2$ is −83. Further, the measurement change amount of the length of the reference tool obtained by calculating the changed Z-axis thermal displacement compensation parameter is +5 (5 μm) in FIG. 4.

When the measurement change amount of the length of the reference tool is substituted to Equation (1), Z-axis compensation amount=$(a_1)(t_1-T_1)+(a_2)(t_2-T_2)$=83(26−20)−83(24.3−20)=141.1 du=14.1 μm. However, the actual measurement change amount of the length of the reference tool is 5 μm, so that the actual Z-axis compensation amount needs to be 9.1 μm.

Further, according to the data second measured by the tool measurement unit 30 and the temperature measurement unit 40, when it is assumed that $t_1$ is 30° C. and $t_2$ is 26° C., both the temperature offsets $T_1$ and $T_2$ are 20° C., $a_1$ is 83, $a_2$ is −83, the measurement change amount of the length of the reference tool is −3 (3 μm), and the values are substituted to Equation (1) again, the Z-axis compensation amount=$(a_1)(t_1-T_1)+(a_2)(t_2-T_2)$=83(30−20)−83(26−20)=332 du=33.2 μm. However, the actual measurement change amount of the length of the reference tool is −3 μm, so that the actual Z-axis compensation amount needs to be 36.2 μm.

Accordingly, when the thermal displacement compensation parameter is not converted according to the current state of the machine tool, the accurate thermal displacement error compensation cannot be performed, and thus processing accuracy cannot be improved.

When the value calculated by the example is substituted to Equation (5) in order to calculate the thermal displacement compensation amount parameter, to which the current state of the machine tool is reflected in real time, $$\begin{pmatrix} \Delta_1 \\ \Delta_2 \end{pmatrix} = \begin{pmatrix} 6 & 4.3 \\ 10 & 6 \end{pmatrix}^{-1} \begin{pmatrix} -50 \\ 30 \end{pmatrix} = \begin{pmatrix} -0.857 & 0.614 \\ 1.429 & -0.857 \end{pmatrix} \begin{pmatrix} -50 \\ 30 \end{pmatrix} = \begin{pmatrix} 61.286 \\ -97.143 \end{pmatrix}$$

is obtained.

When the Z-axis compensation amount is calculated by reflecting the calculated $\Delta_n$ (the compensation parameter change amount for $n^{th}$ the temperature data), it is possible to obtain a final compensation amount, to which the change amount of the length of the reference tool is reflected, as described below. Accordingly, it can be recognized that the thermal displacement compensation parameter is adjusted in the direction in which the reference tool is always measured with the same length (that is, the direction, in which the error of the thermal displacement compensation parameter is removed).

(83+61.286)(26−20)+(−83−97.143)(24.3−20)=91.1
du=9.1 μm (83+61.286)(30−20)+(−83−97.143)(26−20)=362
du=36.2 μm

That is, the same result as that of Equation (3) may be drawn.

Before the calculation of the thermal displacement compensation amount according to FIG. 4, the compensation parameter calculating unit 72 according to the exemplary embodiment may further include a calculation process described below and more accurately calculate a compensation parameter.

Referring to FIG. 5, the compensation parameter calculating unit 72 first obtains mCn that is a combination corresponding to the number of used temperature measurement units based on the number of times of the trial.

That is, according to FIG. 5, the number of temperature measurement units is five, and thus, the temperature matrix required for the calculation is 5×5, trial number combinations available when five numbers are selected from actual trial numbers 1 to 8 regardless of an order are (1, 2, 3, 4, 5) to (4, 5, 6, 7, 8).

Determinants of the temperature data matrixes corresponding to the all of the obtained trial number combinations are calculated.

Then, absolute values of all of the calculated determinant values are listed from the largest value in a descending order. The reason is that the small determinant absolute value means that linear independency between the temperature data rows of the matrix is relatively low. When independency is low, an influence of noise is large when an inverse matrix is calculated and a calculation value of the compensation parameter is large, so that the accurate compensation performance deteriorates.

Then, the thermal displacement compensation parameter matrix is calculated by Equation (5) by using the several top temperature data matrixes (for example, first to fifth grades), in which the absolute value of the determinant value among the listed determinant values is not 0 and is relatively large, and the tool length change amount matrix (the matrixes for the values of Y-ERR and Z-ERR in FIG. 5). The value is calculated and illustrated in a section below "calculated y/z-axis thermal compensation parameters" in FIG. 5.

Then, the matrix having the low correlation according to the correlation analysis between the calculated compensation parameter matrixes is excluded in a subsequent operation.

Then, a final thermal displacement compensation parameter matrix optimized to corresponding equipment is calculated by using an arithmetic mean or the weighted average between the compensation parameter matrixes having the large correlation to perform the processing through the compensation.

In the meantime, a predicted compensation value according to the final thermal displacement compensation parameter may also be provided to the user on the screen of the operating panel 9 in the form of a graph as illustrated in FIG. 8.

Further, on the screen of the operating panel 9 illustrated in FIG. 4, a button or a touch region, by which the functions described below may be performed, may be implemented.

A backup button is a button for backing up the currently calculated thermal displacement compensation parameter in a memory.

A start button is a button for making the thermal displacement compensation amounts of all of the axes be 0. That is, the start button is for the purpose of measuring only an error by the genuine thermal deformation of a structure without an influence of a feeding error by the compensation on a specific value.

A turning button is a button for starting a calculation of the final thermal displacement compensation amount described with reference to FIG. 5.

A program set (PRMSET) button is a button for storing a newly and finally calculated compensation parameter in a thermal displacement compensation function and reflecting the newly and finally calculated compensation parameter, and displaying the compensation parameter on a history screen.

A restore button is a button for restoring the previous thermal displacement parameter backed up by the backup button.

A history button is a button for switching a screen to a compensation parameter turning history screen.

A method of automatically converting a thermal displacement compensation parameter of a machine tool according to an exemplary embodiment of the present invention will be described with reference to FIG. 6.

The method of automatically converting a thermal displacement compensation parameter of a machine tool according to the present invention may include operation S10 of selecting a thermal displacement compensation parameter automatic converting function, operation S20 of storing basic data, operation S30 of selecting a reference tool measurement target, operation S40 of storing reference tool data, operation S50 of measuring a temperature, operation S60 of storing temperature data, operation S70 of determining whether current Z-directional or Y-directional displacement of a tool tip end of the reference tool is changed, operation S80 of calculating a thermal displacement compensation parameter, operation S90 of storing the compensated thermal displacement compensation parameter, and operation S100 of converting a compensation parameter of a thermal displacement compensation equation.

Further, as illustrated in FIG. 6, according to the exemplary embodiment of the present invention, the method of automatically converting a thermal displacement compensation parameter of a machine tool according to the present invention may further include operation S110 of calculating a thermal displacement compensation amount.

The thermal displacement compensation parameter automatic converting function setting unit 80 selects the thermal displacement compensation parameter automatic converting function (S10). When the thermal displacement compensation parameter automatic converting function setting unit 80 does not select the thermal displacement compensation parameter automatic converting function, the method of automatically converting a thermal displacement compensation parameter according to the present invention is not executed.

Then, basic data for compensating for thermal displacement in an X-axis, a Y-axis, or a Z-axis is stored in the basic thermal displacement compensation data storing unit 20 (S20).

Then, the reference tool measurement target selecting unit 10 selects Z-directional or Y-directional displacement of a tip end of the tool that is the measurement target of the reference tool measured by the tool measuring unit 30 (S30).

Then, the Z-directional or Y-directional displacement data of the tool tip end of the reference tool measured by the tool measuring unit 30 is stored in the reference tool data storing unit 50 (S40).

Then, the temperature measuring unit 40 measures a temperature (S50).

Then, the temperature data measured by the temperature measuring unit 40 is stored in the temperature data storing unit 60 (S60).

Then, the reference tool tip end Z-directional or Y-directional displacement change determining unit 71 determines whether a previous Z-directional or Y-directional displacement value of the tool tip end of the reference tool stored in the basic thermal displacement compensation data storing unit 20 corresponds to a current Z-directional or Y-directional displacement value of the tool tip end of the reference tool stored in the reference tool data storing unit 40 (S70). When the values are different from each other, a thermal displacement error is generated, so that it is necessary to change the thermal displacement compensation parameter.

Then, when the Z-directional or Y-directional displacement of the tool tip end of the reference tool is changed, the compensation parameter calculating unit 72 calculates a thermal displacement compensation parameter according to Equation (5) based on the changed Z-directional or Y-directional displacement value of the tool tip end of the reference tool and a temperature (S80).

Then, the thermal displacement compensation parameter calculated by the compensation parameter calculating unit 72 is stored in the compensation parameter storing unit 73 (S90).

Then, the compensation parameter converting unit 74 converts the thermal displacement compensation parameter of the X-axis, Y-axis, or Z-axis thermal displacement compensation equation stored in the basic thermal displacement compensation data storing unit 20 with the thermal displacement compensation parameter stored in the compensation parameter storing unit 73 (S100).

Then, the thermal displacement compensation amount calculating unit 75 calculates an X-axis, Y-axis, or Z-axis thermal displacement compensation amount by Equation (6) by applying the compensation parameter converted by the compensation parameter converting unit 74 (S110).

Accordingly, it is possible to calculate the thermal displacement compensation amount, to which a current temperature state and the like of the machine tool is reflected in real time, to improve processing accuracy of the machine tool.

In the meantime, according to another exemplary embodiment of the present invention, as illustrated in FIG. 11, operation S30 of selecting the reference tool measurement target and operation S40 of storing the reference tool data described with reference to FIG. 6 may be substituted with operation S31 of measuring a processed portion 5a of a processed material 5 and operation S41 of calculating and storing thermal displacement data of the machine tool.

In the meantime, operation S80 of calculating the thermal displacement compensation parameter may further include particular operations described below.

Referring to FIG. 7, when it is determined that the Z-directional or Y-directional displacement of the tool tip end of the reference tool is changed in operation S70, a temperature value is calculated until a value of the minimum number of times of a trial corresponding to be number of temperature measuring units used in operation S50 is satisfied (S81).

Then, each number of times of trial and the temperature data are stored in a look-up table (S82).

Then, the minimum number of times of the trial corresponding to the temperature data is searched in the look-up table (S83). That is, when the number of temperature measuring units is five, a total of 5×5 matrixes is required, so that a minimum of five number of times of the trial is required.

Then, the required minimum number of times of the trial is displayed on the screen (S84). The procedure may also be omitted.

Then, determinants of the temperature data matrixes corresponding to the all of the obtained trial number combinations are calculated (S85).

Then, absolute values of all of the calculated determinant values are listed from the largest value in a descending order, and a small value is removed (S86).

Then, the thermal displacement compensation parameter matrix is calculated by Equation (5) by using the several top temperature data matrixes (for example, first to fifth grades), in which the absolute value of the determinant value among the listed determinant values is not 0 and is relatively large, and the tool length change amount matrix (the matrixes for the values of Y-ERR and Z-ERR in FIG. 5) (S87).

Then, the matrix having the low correlation according to the correlation analysis between the calculated compensation parameter matrixes is excluded in a subsequent operation (S88).

Then, a final thermal displacement compensation parameter matrix optimized to corresponding equipment is calculated by using an arithmetic mean or the weighted average between the compensation parameter matrixes having the large correlation to perform the processing through the compensation (S89).

It would be appreciated by those skilled in the art that various changes and corrections may be made without departing from the technical spirit of the present invention, and the technical range of the present invention is not limited to the contents described in the exemplary embodiments, but shall be defined by the claims and their equivalents.

The invention claimed is:

1. An apparatus for automatically converting a thermal displacement compensation parameter of a machine tool including an operating panel and a main shaft, to which a tool for processing a workpiece is mounted, the apparatus comprising:

a basic thermal displacement compensation data storing unit, which stores basic data for X-axis, Y-axis, or Z-axis thermal displacement compensation;

a tool measuring unit, which measures Z-directional or Y-directional displacement of a tool tip end of a reference tool;

a plurality of temperature measuring units installed at a plurality of points of the machine tool;

a reference tool data storing unit, which stores Z-directional or Y-directional displacement data of the tool tip end of the reference tool measured by the tool measuring unit;

a temperature data storing unit, which stores temperature data measured by the plurality of temperature measuring units; and a control unit, which calculates a thermal displacement compensation parameter based on an average value of temperature data matrixes according to the number of the plurality of temperature measuring units and a Z-directional or Y-directional displacement change amount of the tool tip end of the reference tool, wherein the control unit includes:

a reference tool tip end Z-directional or Y-directional displacement change determining unit, which determines whether a Z-directional or Y-directional displacement value of the tool tip end of the reference tool stored in the basic thermal displacement compensation data storing unit corresponds to a Z-directional or Y-directional displacement value of the tool tip end of the reference tool stored in the reference tool data storing unit;

a compensation parameter calculating unit, which when the Z-directional or Y-directional displacement of the tool tip end of the reference tool is changed as a result of the determination by the reference tool tip end Z-directional or Y-directional displacement change determining unit, calculates a thermal displacement compensation parameter according to the changed Z-directional or Y-directional displacement value of the tool tip end of the reference tool and a temperature;

a compensation parameter storing unit, which stores the compensation parameter calculated by the compensation parameter calculating unit;

a compensation parameter converting unit, which converts the compensation parameter of the X-axis, Y-axis, or Z-axis thermal displacement compensation equation stored in the basic thermal displacement compensation data storing unit with the compensation parameter stored in the compensation parameter storing unit; and a thermal displacement compensation amount calculating unit, which calculates a thermal displacement compensation amount by the thermal displacement compensation equation, to which the compensation parameter converted by the compensation parameter converting unit is applied, wherein the machine tool is operated at a predetermined speed to process the workpiece using the calculated displacement compensation parameter.

2. The apparatus of claim 1, further comprising:

a reference tool measurement target selecting unit, which selects a measurement target of the reference tool measured by the tool measuring unit; and a thermal displacement compensation parameter automatic converting function setting unit, wherein when the reference tool measurement target selecting unit selects a length as the measurement target of the reference tool measured by the tool measurement unit, a Z-axis thermal displacement compensation parameter is automatically converted, and when the reference tool measurement target selecting unit selects a diameter as the measurement target of the reference tool measured by the tool measurement unit, an X-axis or Y-axis thermal displacement compensation parameter is automatically converted.

3. The apparatus of claim 1, wherein the compensation parameter calculating unit calculates the compensation parameter by Equation (5), $$\begin{pmatrix} \Delta_1 \\ \Delta_2 \\ \dots \\ \Delta_n \end{pmatrix} = \begin{pmatrix} b_{11}b_{12} \dots b_{1n} \\ b_{21}b_{22} \dots b_{2n} \\ \dots \\ b_{n1}b_{n2} \dots b_{nn} \end{pmatrix}^{-1} \begin{pmatrix} -K_1 \\ -K_2 \\ \dots \\ -K_n \end{pmatrix} \quad \text{[Equation (5)]}$$

$\Delta_n$: compensation parameter change amount (error amount) for $n^{th}$ temperature sensor $b_{hn}$: temperature data of $n^{th}$ temperature sensor measured in $h^{th}$ to measurement order $K_n$: Z-directional or Y-directional displacement change amount tool tip end of reference tool measured in $n^{th}$ measurement order.

4. The apparatus of claim 3, wherein a matrix for the $n^{th}$ temperature data in the $h^{th}$ tool measurement order is obtained by calculating mCn that is a temperature data combination corresponding to the total number m of times of a measurement (measurement of temperature sensor data and a reference tool change amount) and the number n of the plurality of temperature measuring units, calculating determinants of the plurality of temperature data matrixes, and removing the calculated determinant value having an absolute value of 0, or one or more calculated determinant values having small absolute values among the absolute values of the calculated determinant values of the plurality of temperature data matrixes in order.

5. The apparatus of claim 4, wherein a compensation parameter matrix is calculated by substituting the temperature data matrix corresponding to the non-removed determinants having large absolute values to Equation (5), a predetermined number of compensation parameter matrixes is excluded from the compensation parameter matrixes having a small correlation through a correlation analysis of the compensation parameter matrix, and a final thermal displacement compensation parameter is calculated by using an arithmetic mean or a weighted average of the selected compensation parameter matrixes.

6. The apparatus of claim 1, wherein the thermal displacement compensation amount calculating unit calculates the thermal displacement compensation amount by Equation (6), $(a_1+\Delta_1)(t_1-T_1)+(a_2+\Delta_2)(t_2-T_2)+ \dots +(a_n+\Delta_n)(t_n-T_n)$=thermal displacement compensation amount [Equation(6)].

$a_n$: $n^{th}$ compensation parameter $\Delta_n$: compensation parameter change amount for $n^{th}$ temperature data $t_n$: $n^{th}$ temperature data $T_n$: $n^{th}$ temperature offset 7. A method of automatically converting a thermal displacement compensation parameter of a machine tool, the method comprising:
   selecting, by a thermal displacement compensation parameter automatic converting function selecting unit, a thermal displacement compensation parameter automatic converting function;
   storing basic data for X-axis, Y-axis, or Z-axis thermal displacement compensation in a basic thermal displacement compensation data storing unit;
   selecting, by a reference tool measurement target selecting unit, Z-directional or Y-directional displacement of a tool tip end that is a measurement target of a reference tool measured by a tool measuring unit;
   storing Z-directional or Y-directional displacement data of the tool tip end of the reference tool measured by the tool measuring unit in a reference tool data storing unit;
   measuring a temperature by a temperature measuring unit;
   storing temperature data measured by the temperature measuring unit in a temperature data storing unit;
   determining by, a reference tool tip end Z-directional or Y-directional displacement change determining unit, whether a previous Z-directional or Y-directional displacement value of the tool tip end of the reference tool stored in the basic thermal displacement compensation data storing unit corresponds to a current Z-directional or Y-directional displacement value of the tool tip end of the reference tool stored in the reference tool data storing unit;
   when the Z-directional or Y-directional displacement of the tool tip end of the reference tool is changed, calculating a thermal displacement compensation parameter according to an average value of temperature data matrixes according to the number of a plurality of temperature measuring units and a Z-directional or Y-directional displacement change amount of the tool tip end;
   storing the thermal displacement compensation parameter calculated by the compensation parameter calculating unit in a compensation parameter storing unit; and
   converting, by a compensation parameter converting unit, a thermal displacement compensation parameter of an X-axis, Y-axis, or Z-axis thermal displacement compensation equation stored in the basic thermal displacement compensation data storing unit with the thermal displacement compensation parameter stored in the compensation parameter storing unit,
   wherein the machine tool is operated at a predetermined speeed to process the workpiece using the calculated displacement compensation parameter.

8. The method of claim 7, wherein the calculating of the thermal displacement compensation parameter includes
   calculating mCn that is a temperature data combination corresponding to the number of the plurality of temperature measuring units,
   calculating determinants of the plurality of temperature data matrixes,
   removing the calculated determinant value having an absolute value of 0, or one or more calculated determinant values having small absolute values among the absolute values of the calculated determinant values of the plurality of temperature data matrixes in order, and
   obtaining a compensation parameter matrix by substituting the selected determinant values of the plurality of temperature data matrixes by Equation (5) below, $$\begin{pmatrix} \Delta_1 \\ \Delta_2 \\ \ldots \\ \Delta_n \end{pmatrix} = \begin{pmatrix} b_{11} b_{12} & \ldots & b_{1n} \\ b_{21} b_{22} & \ldots & b_{2n} \\ & \ldots & \\ b_{n1} b_{n2} & \ldots & b_{nn} \end{pmatrix}^{-1} \begin{pmatrix} -K_1 \\ -K_2 \\ \ldots \\ -K_n \end{pmatrix} \quad \text{[Equation (5)]}$$

excluding a predetermined number of compensation parameter matrixes from the compensation parameter matrixes having a small correlation through a correlation analysis of the compensation parameter matrix, and
   calculating a final thermal displacement compensation parameter by using an arithmetic mean or a weighted average of the selected compensation parameter matrixes.

9. The method of claim 7, further comprising:
   after the converting of the compensation parameter of the X-axis, Y-axis, or Z-axis thermal displacement compensation equation,
   calculating, by a thermal displacement compensation amount calculating unit, an X-axis, Y-axis, or Z-axis thermal displacement compensation amount by applying the compensation parameter converted by the compensation parameter converting unit.

10. An apparatus for automatically converting a thermal displacement compensation parameter of a machine tool including an operating panel and a main shaft, to which a tool for processing a workpiece is mounted, the apparatus comprising:
    a basic thermal displacement compensation data storing unit, which stores basic data for X-axis, Y-axis, or Z-axis thermal displacement compensation;
    an indicator, which is clapped to the main shaft and measures a depth or a width of a processed portion of a processed material;
    a plurality of temperature measuring units installed at a plurality of points of the machine tool;
    a thermal displacement data calculating and storing unit, which calculates thermal displacement data of the machine tool from the processed portion measured by the indicator and stores the calculated data;
    a temperature data storing unit, which stores temperature data measured by the plurality of temperature measuring units; and
    a control unit, which calculates a thermal displacement compensation parameter based on an average value of temperature data matrixes according to the number of plurality of temperature measuring units and the thermal displacement data of the machine tool,
    wherein the control unit includes:
    a reference tool tip end Z-directional or Y-directional displacement change determining unit, which determines whether a Z-directional or Y-directional displacement value of the tool tip end of the reference tool stored in the basic thermal displacement compensation data storing unit corresponds to a Z-directional or Y-directional displacement value of the tool tip end of the reference tool stored in the thermal displacement calculating and storing unit of the machine tool;
    a compensation parameter calculating unit, which when the Z-directional or Y-directional displacement of the tool tip end of the reference tool is changed as a result of the determination by the reference tool tip end Z-directional or Y-directional displacement change determining unit, calculates a thermal displacement compensation parameter according to the changed Z-directional or Y-directional displacement value of the tool tip end of the reference tool and a temperature;

a compensation parameter storing unit, which stores the compensation parameter calculated by the compensation parameter calculating unit;

a compensation parameter converting unit, which converts a compensation parameter of the X-axis, Y-axis, or Z-axis thermal displacement compensation equation stored in the basic thermal displacement compensation data storing unit with the compensation parameter stored in the compensation parameter storing unit; and a thermal displacement compensation amount calculating unit, which calculates a thermal displacement compensation amount by a thermal displacement compensation equation, to which the compensation parameter converted by the compensation parameter converting unit is applied, wherein the machine tool is operated at a predetermined speed to process the workpiece using the calculated displacement compensation parameter.

11. The apparatus of claim 10, wherein the compensation parameter calculating unit calculates the compensation parameter by Equation (5), $$\begin{pmatrix} \Delta_1 \\ \Delta_2 \\ \cdots \\ \Delta_n \end{pmatrix} = \begin{pmatrix} b_{11} b_{12} \cdots b_{1n} \\ b_{21} b_{22} \cdots b_{2n} \\ \cdots \\ b_{n1} b_{n2} \cdots b_{nn} \end{pmatrix}^{-1} \begin{pmatrix} -K_1 \\ -K_2 \\ \cdots \\ -K_n \end{pmatrix} \quad \text{[Equation (5)]}$$

$\Delta_n$: compensation parameter change amount (error amount) for $n^{th}$ temperature sensor $b_{hn}$: temperature data of $n^{th}$ temperature sensor measured in $h^{th}$ to measurement order $K_n$: Z-directional or Y-directional displacement change amount tool tip end of reference tool measured in $n^{th}$ measurement order.

12. The apparatus of claim 11, wherein a matrix for the $n^{th}$ temperature data in the $h^{th}$ tool measurement order is obtained by calculating mCn that is a temperature data combination corresponding to the total number m of times of a measurement (measurement of temperature sensor data and a reference tool change amount) and the number n of the plurality of temperature measuring units, calculating determinants of the plurality of temperature data matrixes, removing the calculated determinant value having an absolute value of 0, or one or more calculated determinant values having small absolute values among the absolute values of the calculated determinant values of the plurality of temperature data matrixes in order, calculating a compensation parameter matrix by substituting the temperature data matrix corresponding to the non-removed determinants having large absolute values to Equation (5), excluding a predetermined number of compensation parameter matrixes from the compensation parameter matrixes having a small correlation through a correlation analysis of the compensation parameter matrix, and calculating a final thermal displacement compensation parameter by using an arithmetic mean or a weighted average of the selected compensation parameter matrixes.

13. The apparatus of claim 10, wherein the thermal displacement compensation amount calculating unit calculates the thermal displacement compensation amount by Equation (6).

$$(a_1+\Delta_1)(t_1-T_1)+(a_2+\Delta_2)(t_2-T_2)+ \ldots +(a_n+\Delta_n)(t_n-T_n) = \text{thermal displacement compensation amount} \quad \text{[Equation(6)]}$$

$a_n$: $n^{th}$ compensation parameter $\Delta_n$: compensation parameter change amount for $n^{th}$ temperature data $t_n$: $n^{th}$ temperature data $T_n$: $n^{th}$ temperature offset

* * * * *